United States Patent [19]

Benun

[11] Patent Number: 4,665,559

[45] Date of Patent: May 12, 1987

[54] FM-TV AUDIO ADAPTER

[76] Inventor: Andrew Benun, 443 N. Clinton, Orange, Calif. 92667

[21] Appl. No.: 758,051

[22] Filed: Jul. 23, 1985

[51] Int. Cl.⁴ .......................... H04B 1/06; H04H 1/04
[52] U.S. Cl. ........................................ 455/3; 455/205; 455/351
[58] Field of Search .................... 358/144, 189, 86; 455/3-6, 89, 42, 270, 351, 205, 20

[56] References Cited

U.S. PATENT DOCUMENTS

| | | | |
|---|---|---|---|
| 3,259,689 | 7/1966 | Sienkiewicz | 455/20 |
| 3,860,873 | 1/1975 | Ringstad | 455/5 |
| 3,969,673 | 7/1976 | Nordlöf | 455/89 |

FOREIGN PATENT DOCUMENTS 2554657  5/1985  France .................................. 455/89

Primary Examiner—Jin F. Ng
Attorney, Agent, or Firm—Francis X. LoJacono

[57] ABSTRACT

An FM-TV adapter in combination with a personalized mini-FM-stereo radio having a stereo headphone whereby RF (TV) signals are transmitted into the mini-FM-stereo radio by means of the FM-TV adapter, the FM-stereo radio being adjusted to select a given RF signal and transmit only the audio portion thereof back through the adapter to the headphones for personalized listening.

16 Claims, 2 Drawing Figures

FM-TV AUDIO ADAPTER

BACKGROUND OF THE INVENTION

1. Field of the Invention

This invention relates generally to an FM or FM-stereo-pickup device, and more particularly to a personalized FM-TV, pickup-audio adapter in combination with a pocket-size stereo radio, the pickup-audio adapter being arranged to receive FM and FM-stereo TV signals.

With the introduction of stereo cable television which now includes Music Television, HBO, Showtime, as well as movie channels and other video programs not normally found on regular radio FM bands, there has arisen a need to provide a personalized means for receiving these selected input signals without forcing others to listen to a selected program.

Typically, the sound generated by such stations must be received through the TV unit itself, and thus the audio produced is such that all those within hearing range of the TV are subjected to the music emanating therefrom. As is often the case, one individual might enjoy a particular type of music provided by a given TV channel, while another individual might not appreciate the same program.

Hence, the present invention has been designed to provide an overall answer to the above-mentioned problem, one important object of the present invention being to provide an FM-pickup adapter that allows one—through the use of the adapter in combination with a miniature personalized FM radio and headphone set—to tap and select a given TV-audio input without interfering with the program input of the TV itself.

Still another object of the invention is to provide an FM-pickup adapter as mentioned above that can be readily connected to a TV-input signal prior to the signal being received by the TV or a cable-converter unit.

A further object of the present invention is to provide a device of this character that is capable of receiving and selecting signals from several sources, including cable television (CATV), master antenna television (MATV), satellite master antenna television (SMATV), satellite television—or even a common outdoor antenna.

It is a further object of the invention to provide an FM-TV adapter that is easily interconnected to any type of TV-input signal, and allows for individual adjustability of station selection as well as complete volume control.

A still further object of the invention is to provide an FM-TV adapter that has relatively few operating parts, so that the adapter is easy to service and maintain.

It is still a further object of the invention to provide a device of this character that is simple in construction, and is relatively inexpensive to manufacture.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only.

DESCRIPTION OF THE PREFERRED EMBODIMENT

Figure 1:
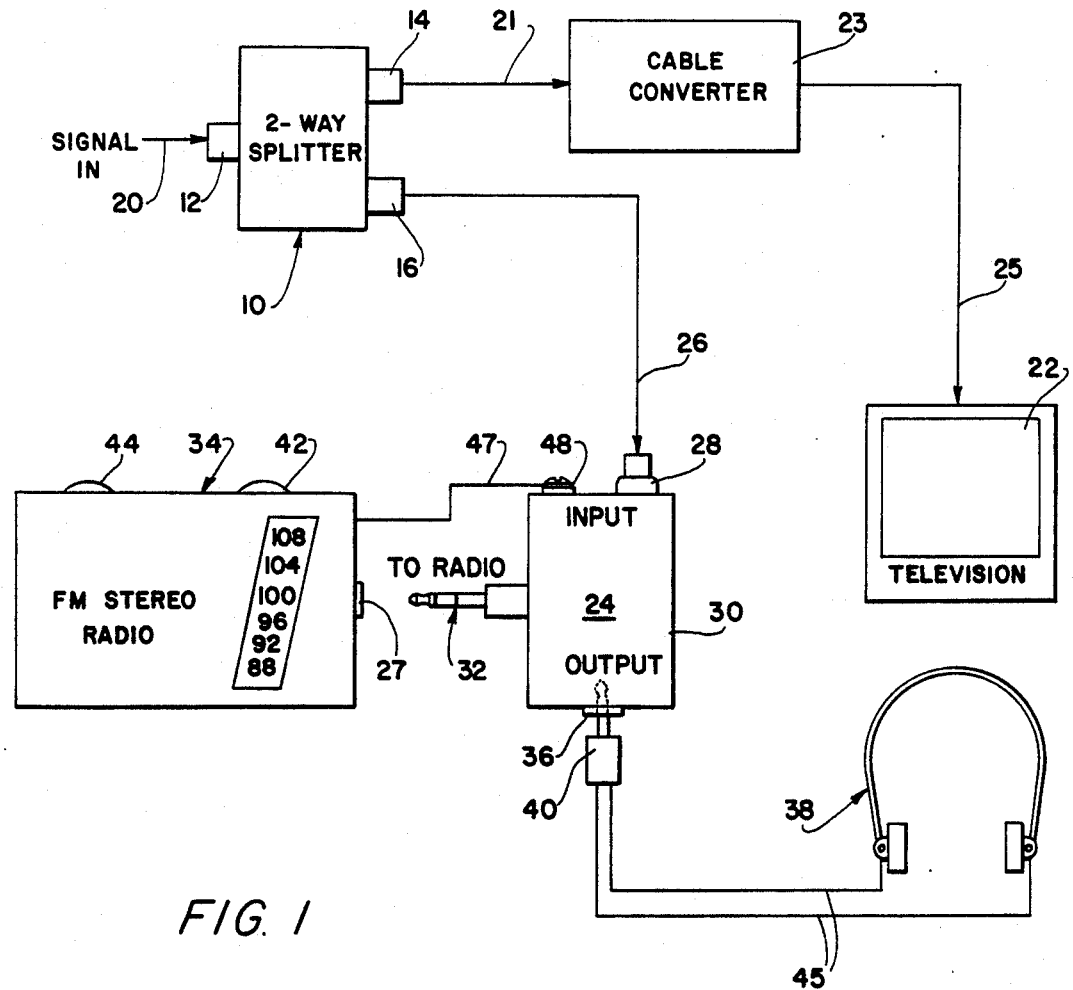
FIG. 1 is a somewhat block-type diagram illustrating the basic components including a two-way signal splitter, cable converter, television, and an FM-stereo radio with the adapter being interconnected between the signal splitter, radio and headphone.

Referring more particularly to the illustration of FIG. 1, there is shown a signal-splitter means 10 which is formed having an input member 12 and at least one, but preferably two output members 14 and 16. Accordingly, a television (TV) input signal, indicated by arrow 20, is connected to input member 12. Signal 20 is split in the well-known manner, whereby the signal passes through output member 14 which is connected either directly to the television 22 or to the cable converter 23 that would be interposed between signal splitter 10 and television 22 in the typical known manner using connecting line 25.

The TV signal 20 is also transmitted through the second output member 16 and is directed to the FM-TV-audio adapter, generally indicated at 24, by connecting line 26 which is coupled to a female jack 28 mounted to one side of the audio-adapter housing 30, whereby the general TV signal 20 is transmitted through male stereo plug 32 and into a stereo receiver defined as a mini-FM-stereo radio, designated at 34, which is also known in the industry as a "Walkman FM". This allows signal 20 to be fed into the stereo receiver 34 when male jack 32 is coupled to female jack 27. The FM-TV audio adapter 24 includes an audio-output jack defined by a mini-stereo-earphone-output jack 36 to which stereo headphone 38 is connected by the headset jack 40.

Thus, one may selectively adjust turning knob 42 to any one of several different FM or FM-stereo audio signals provided by the TV or FM signal which is transmitted by a given TV, cable or radio station. The selected audio transmission is then transferred to the headphone 38 by way of plug 32, adapter 24, and headphone jack 40, and into stereo headphone 38, thereby allowing the wearer of the headphone to either listen separately to the selected audio portion of a TV station or listen to and watch the associated TV program at the same time. Furthermore, television set 22 as well as cable converter 23 may be operated independently of the audio being tuned in by the FM receiver 34.

It should be further noted that the volume of the selected audio transmission is individually controlled by volume knob 44 of the stereo-FM receiver 34.

There are several TV (RF) signal sources that can provide suitable means by which the FM and/or FM-stereo-audio portion of a TV transmission can be tapped for listening in the manner herein described when the present invention is employed. The principal sources include cable television (CATV); master antenna television (MATV); satellite master antenna television (SMATV); satellite television or signals received over common outdoor antennas.

Figure 2:
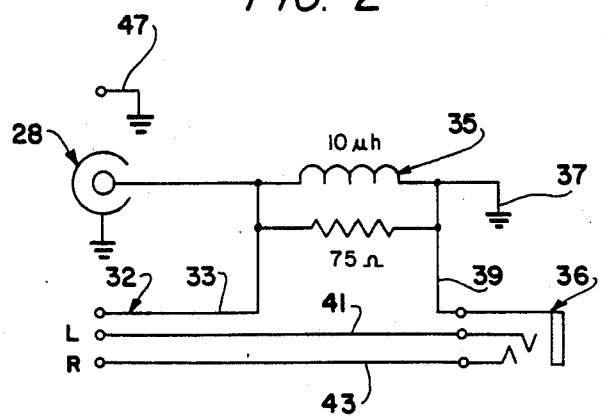
FIG. 2 is a schematic wiring diagram of the FM-TV adapter.

As indicated in the wiring diagram of FIG. 2, RF signal 20 enters audio adapter 24 by way of an RCAtype female jack 28. From jack 28 the RF signal is passed to the mini-stereo-male plug 32 by line 33, thereby transmitting the signal into the radio receiver 34. Thus, any TV-audio channel can be selected by means of the stereo radio. The selected audio portion of the signal is sent back through line 33 and allowed to pass through RF choke (coil) 35 and be transmitted to the headphone 38 by means of the mini-stereo-female jack 36.

It is important to note that choke 35 prevents the RF signal from being shorted by ground 37. However, the audio signal is of a "baseband" nature and recognizes the choke (coil) 35 as a short, which completes the circuit through line 39 and allows the headphones to operate. Lines 41 and 43 are for the stereo signals to provide left and right output to the headphones. Furthermore, it should be noted that ground 37 prevents the headphone cable 45 from operating as an antenna, which is normally the case when the headphones are used in the conventional manner. That is, headphone cable 45, when plugged directly into radio 34, defines an antenna. When headphone jack 40 is plugged into output jack 36, chassis ground 37 prevents cable 45 from acting as an antenna.

In the unlikely event that background noise is experienced—which could possible be caused by a strong local station—correction can readily be accomplished by connecting a ground wire 47 to ground terminal 48 mounted to housing 30 and to the metal case of radio 34. However, if radio 34 has a plastic housing, ground wire 47 is then simply connected to the negative (−) side of the battery which is provided in the mini-radio set.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. An FM-TV-audio adapter adapted to receive RF signals, wherein only the audio portions of said RF signals are allowed to be transmitted through the output of said adapter and into a headphone, said adapter comprising:
   a housing;
   an input jack mounted to said housing;
   an RF-signal source connected to said input jack, whereby said RF signals are transmitted to said FM-TV-audio adapter;
   a male stereo plug mounted in said housing and connected to said input jack, allowing said RF signals to be passed therethrough;
   means for selectively tuning to a particular RF signal, said means being adapted to be connected to said FM-TV-audio adapter by means of said male stereo plug;
   an audio-output jack mounted to said housing to allow said headphone to be connected therethrough; and
   a means interposed between said RF-signal-input jack of said audio-output jack to prevent said RF signals from being transmitted to said audio-output jack.

2. An FM-TV-audio adapter as recited in claim 1, wherein said tuning means comprises a mini-stereo-radio receiver.

3. An FM-TV-audio adapter as recited in claim 2, wherein said means to prevent said RF signals from being transmitted to said audio-output jack comprises a choke coil.

4. A combination as recited in claim 2, including a cable splitter mounted between said RF-signal source and said FM-TV-audio adapter.

5. An FM-TV-audio adapter in combination with a mini-FM-stereo radio and a stereo headphone, whereby RF signals are selectively tuned to produce only the audio portion of the selected RF signal, wherein the combination includes:
   an FM-TV-audio adapter adapted to receive said RF signals and transmit the audio portion of said RF signals;
   an RF-signal source connected to said FM-TV-audio adapter;
   means for receiving and selectively tuning a particular RF signal, said means being adapted to be connected to said FM-TV-audio adapter;
   means for connecting and transmitting said RF signals from said FM-TV-audio adapter to said receiving and tuning means;
   means for connecting and transmitting said audio portion of said RF signal to said headphone; and
   a headphone for listening to said audio portion thereof.

6. A combination as recited in claim 5, wherein said receiving-and-tuning means comprises a mini-FM-stereo-radio receiver.

7. A combination as recited in claim 6, wherein said FM-TV-audio adapter includes a housing having an RF-signal-input jack, and wherein said connecting-and-transmitting means of said RF signals to said mini-FM-radio receiver comprises a male stereo plug mounted to said housing.

8. A combination as recited in claim 7, wherein said means for connecting and transmitting said audio portion comprises an audio-output jack mounted to said housing, and wherein said headphone includes a headphone plug adapted to be coupled to said audio-output jack.

9. A combination as recited in claim 8, wherein said FM-TV-audio adapter includes means interposed between said RF-signal-input jack and said audio-output jack to prevent said Rf signals from being transmitted to said audio-output jack.

10. A combination as recited in claim 9, wherein said means to prevent said RF signals from being transmitted to said audio-output jack comprises a choke coil.

11. A combination as recited in claim 10, wherein said RF-signal source is provided by a cable-television system.

12. A combination as recited in claim 10, wherein said RF-signal source is provided by a master-antenna-television system.

13. A combination as recited in claim 10, wherein said RF-signal source is provided by a satellite-master-antenna-television system.

14. A combination as recited in claim 10, wherein said RF-signal-source is provided by a satellite-television system.

15. A combination as recited in claim 10, wherein said RF-signal source is provided by a television antenna.

16. A combination as recited in claim 5, including a cable splitter mounted between said RF-signal source and said FM-TV-audio adapter.

* * * * *